US011012847B2

(12) United States Patent
Qi et al.

(10) Patent No.: US 11,012,847 B2
(45) Date of Patent: *May 18, 2021

(54) METHOD, APPARATUS, AND COMPUTER READABLE MEDIUM FOR SWITCHING BETWEEN LOWER ENERGY AND HIGHER ENERGY WIRELESS COMMUNICATION TECHNIQUES

(71) Applicant: Apple Inc., Cupertino, CA (US)

(72) Inventors: Emily H. Qi, Gig Harbor, WA (US);
Carlos Cordeiro, Portland, OR (US);
Po-Kai Huang, San Jose, CA (US);
David J. McCall, Dallas, TX (US);
Robert D. Hughes, Tualatin, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,528

(22) Filed: Aug. 22, 2019

(65) Prior Publication Data
US 2020/0145810 A1     May 7, 2020

Related U.S. Application Data

(63) Continuation of application No. 15/981,135, filed on May 16, 2018, now Pat. No. 10,425,803, which is a
(Continued)

(51) Int. Cl.
*H04W 8/00*    (2009.01)
*H04L 29/08*   (2006.01)
(Continued)

(52) U.S. Cl.
CPC ......... *H04W 8/005* (2013.01); *H04L 67/1091* (2013.01); *H04L 67/16* (2013.01);
(Continued)

(58) Field of Classification Search
CPC ..... H04W 8/005; H04W 76/10; H04W 76/23; H04W 4/70; H04L 67/16; H04L 69/18
See application file for complete search history.

(56) References Cited

U.S. PATENT DOCUMENTS 8,391,260 B1 *  3/2013  Kopikare .......... H04W 52/0216
                                                370/338
9,674,643 B2 *  6/2017  Qi ........................ H04L 69/18
(Continued)

*Primary Examiner* — Mohammad S Anwar
(74) *Attorney, Agent, or Firm* — Kowert, Hood, Munyon, Rankin & Goetzel, P.C.

(57) ABSTRACT

Methods, apparatuses, and computer-readable media for a wireless communication device switching between lower energy and higher energy wireless communication techniques are disclosed. The wireless communication device includes processing circuitry to: receive a packet in accordance with a lower energy wireless peer-to-peer (P2P) network communication technique from a service provider wireless device, wherein the packet indicates one or more services provided by the service provider wireless device. The processing circuitry may be further to: determine to switch to a higher energy wireless P2P communication technique to communicate with the service provider wireless device based on a determination that a target service is provided by the service provider wireless device. The processing circuitry may be further to: perform a connectivity setup with the provider wireless device to use the target service in accordance with the higher energy wireless P2P communication technique.

20 Claims, 9 Drawing Sheets

Related U.S. Application Data continuation of application No. 15/496,567, filed on Apr. 25, 2017, now Pat. No. 9,998,905, which is a continuation of application No. 14/565,868, filed on Dec. 10, 2014, now Pat. No. 9,674,643.

(60) Provisional application No. 61/954,418, filed on Mar. 17, 2014.

(51) Int. Cl.

| | |
|---|---|
| H04W 76/23 | (2018.01) |
| H04W 4/70 | (2018.01) |
| H04W 4/80 | (2018.01) |
| H04L 29/06 | (2006.01) |
| H04W 76/10 | (2018.01) |
| H04W 84/12 | (2009.01) |
| H04W 88/06 | (2009.01) |

(52) U.S. Cl.
CPC ............... *H04L 69/18* (2013.01); *H04W 4/70* (2018.02); *H04W 4/80* (2018.02); *H04W 76/10* (2018.02); *H04W 76/23* (2018.02); *H04W 84/12* (2013.01); *H04W 88/06* (2013.01); *Y02D 30/00* (2018.01); *Y02D 30/70* (2020.08)

(56) References Cited

U.S. PATENT DOCUMENTS

| | | | |
|---|---|---|---|
| 9,998,905 B2* | 6/2018 | Qi | H04W 4/80 |
| 10,425,803 B2* | 9/2019 | Qi | H04W 4/80 |
| 2012/0311176 A1* | 12/2012 | Dellinger | H04L 12/145 |
| | | | 709/232 |

* cited by examiner

METHOD, APPARATUS, AND COMPUTER READABLE MEDIUM FOR SWITCHING BETWEEN LOWER ENERGY AND HIGHER ENERGY WIRELESS COMMUNICATION TECHNIQUES

PRIORITY CLAIM

This application is a continuation of U.S. patent application Ser. No. 15/981,135, filed May 16, 2018, which is a continuation of U.S. patent application Ser. No. 15/496,567, filed Apr. 25, 2017, now issued as U.S. Pat. No. 9,998,905, which is a continuation of U.S. patent application Ser. No. 14/565,868, filed Dec. 10, 2014, now issued as U.S. Pat. No. 9,674,643, which claims the benefit of priority under 35 USC 119(e) to U.S. Provisional Patent Application Ser. No. 61/954,418, filed Mar. 17, 2014, each of which is incorporated herein by reference in its entirety.

TECHNICAL FIELD

Embodiments pertain to wireless networks. Some embodiments relate to wireless networks where peer devices provide services to other peer devices and a lower energy wireless peer-to-peer (P2P) communication technique is used with a higher energy wireless communication technique.

BACKGROUND

Often wireless devices use services from other wireless devices. The wireless devices may provide such services as printing, Internet Access, and interactive game playing. With the emergence of applications for social networking, Internet of Things (IoT), wireless docking, etc., peer-to-peer (P2P) networking is becoming more popular.

Thus there are general needs for methods, apparatuses, and computer readable media for improved peer-to-peer networking.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
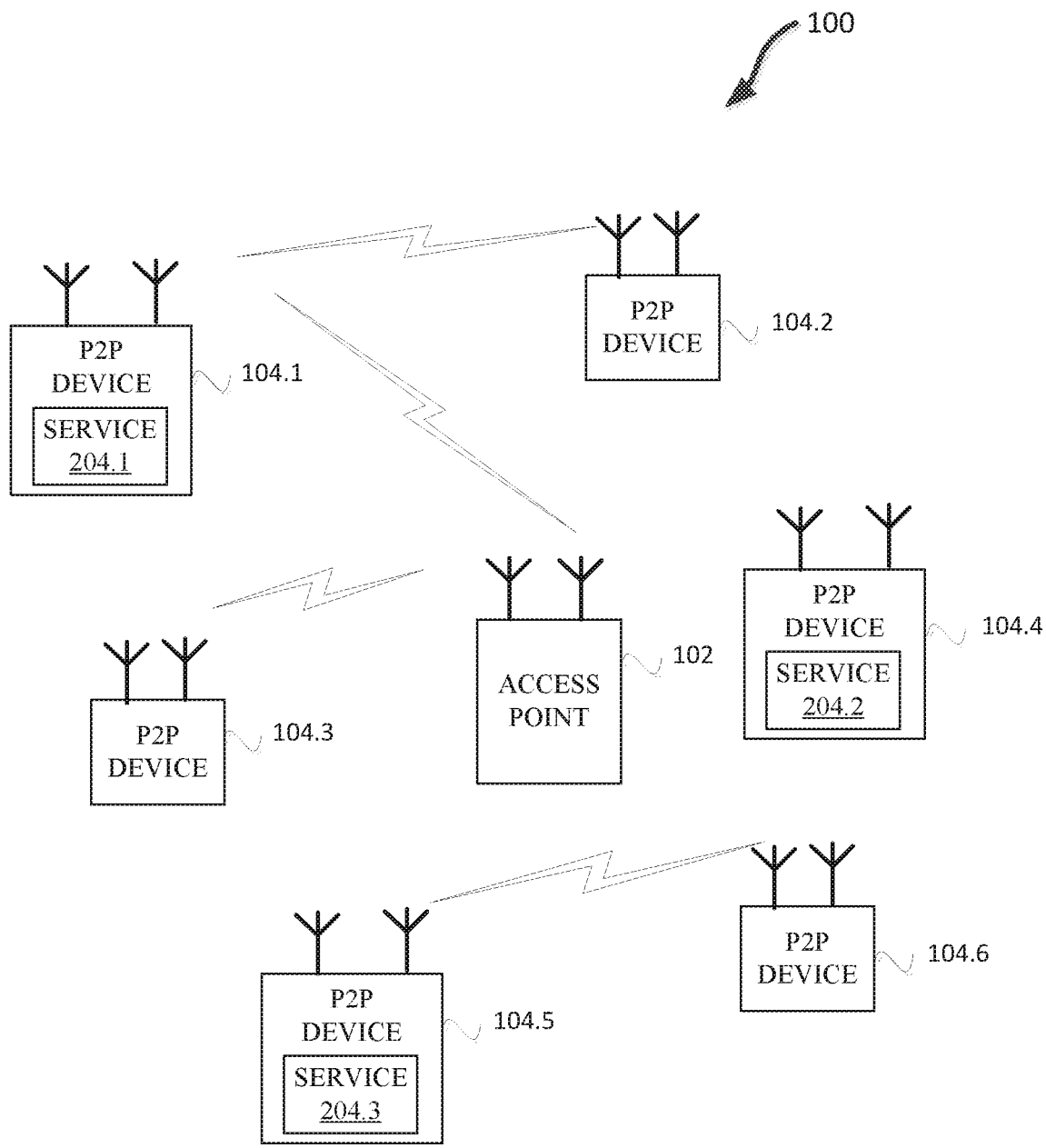
FIG. 1 illustrates a wireless network in accordance with some embodiments.

FIG. 1 illustrates a wireless network 100 in accordance with some embodiments. The wireless network 100 may comprise an access point (AP) 102, and a plurality of peer-to-peer (P2P) devices 104. The access point (AP) 102 and the P2P devices 104 may be wireless transmit and receive devices such as cellular telephone, handheld wireless device, wireless glasses, wireless watch, wireless personal device, tablet, printer, set-top device, or another device. The AP 102 and P2P devices 104 may be configured to transmit and receive using a higher energy wireless communication technique, which may be a local area wireless communication technique, or a communication technique such as an Institute of Electrical and Electronics Engineers (IEEE) 802.11, 802.11 a/g/ag/n/ac/ax/s/e/u, WiFi®, or 802.16, and a lower energy wireless P2P technology or communication technique such as BlueTooth®, BlueTooth® Low Energy (BLE), 802.15.4, neighbor aware networking (NAN) program, Near-field communication (NFC), and/or a wireless personal area network (WPAN) wireless technology or communication technique.

The AP 102 and P2P devices 104 may use two or more protocols simultaneously. Some of the protocols define protocols where the P2P devices 104 communicate with an AP 102, and some define protocols for P2P devices 104 to communicate with one another. Some protocols such as 802.11 define protocols for both communicating with the AP 102 and for peer-to-peer communication.

The P2P device 104 may be configured for peer-to-peer communication where two or more devices connect directly without the need to go through the AP 102. For example, P2P device 104.5 and P2P device 104.6 are communicating with a peer-to-peer relationship without communicating with the AP 102, and P2P devices 104.5 and 104.6 may be using, for example, 802.11 or BlueTooth®. P2P device 104.3 is communicating with the AP 102 using, for example, 802.11. P2P device 104.1 is communicating with P2P device 104.2 with a peer-to-peer relationship and P2P device 104.2 is communicating with the AP 102 using, for example 802.11. The AP 102 may act as a master to the P2P devices 104 in some protocols. The AP 102 and P2P devices 104 may be configured to operate in accordance with orthogonal frequency division multiple access (OFDMA) on a number of channels. In example embodiments, the AP 102 and/or P2P devices 104 may scan the channels looking for beacon frames from other P2P devices 104.

In example embodiments, the AP 102 and/or P2P devices 104 may operate in accordance with high-efficiency wireless or high-efficiency Wi-Fi (HEW) communications. In example embodiments, the AP 102 and/or P2P devices 104 operate in accordance with multi-user multiple-input multiple-output (MU-MIMO), OFDMA, and/or space division multiple access.

The P2P devices 104 may be configured to communicate with one another using Wi-Fi Direct, which may be called Wi-Fi peer-to-peer. The P2P devices 104 may include services 204 (see also FIG. 2). The P2P devices 104 may be configured to operate in accordance with Wi-Fi Direct Services (WFDS). In some embodiments the P2P devices 104 may use another standard to provide services to one another. Services 204 in WFDS may be divided into four standard type of service: Send, Play, Display, and Print. For example, P2P device 104.5 may be a printer and P2P device 104.6 may be a laptop computer. The laptop P2P device 104.6 may send a file to be printed to printer P2P device 104.5 using the peer-to-peer protocol Wi-Fi Direct or another peer-to-peer protocol.

Two or more P2P devices 104 that are communicating using peer-to-peer communication may be called a P2P group. For example, P2P device 104.5 and P2P device 104.6 are a P2P group. A base station set (BSS) may comprise the P2P devices 104 that are communicating with the AP 102 with the BSS being identified by a basic service set identification (BSSID). The BSS may operate on a primary channel and one or more secondary channels or sub-channels. The P2P protocols may operate on the same or different channels as the BSS.

P2P devices 104 and AP 102 may be configured to operate in accordance with the functions, methods, and apparatuses described herein for switching between a lower energy wireless P2P communication technique and a higher energy wireless communication technique.

Figure 2:
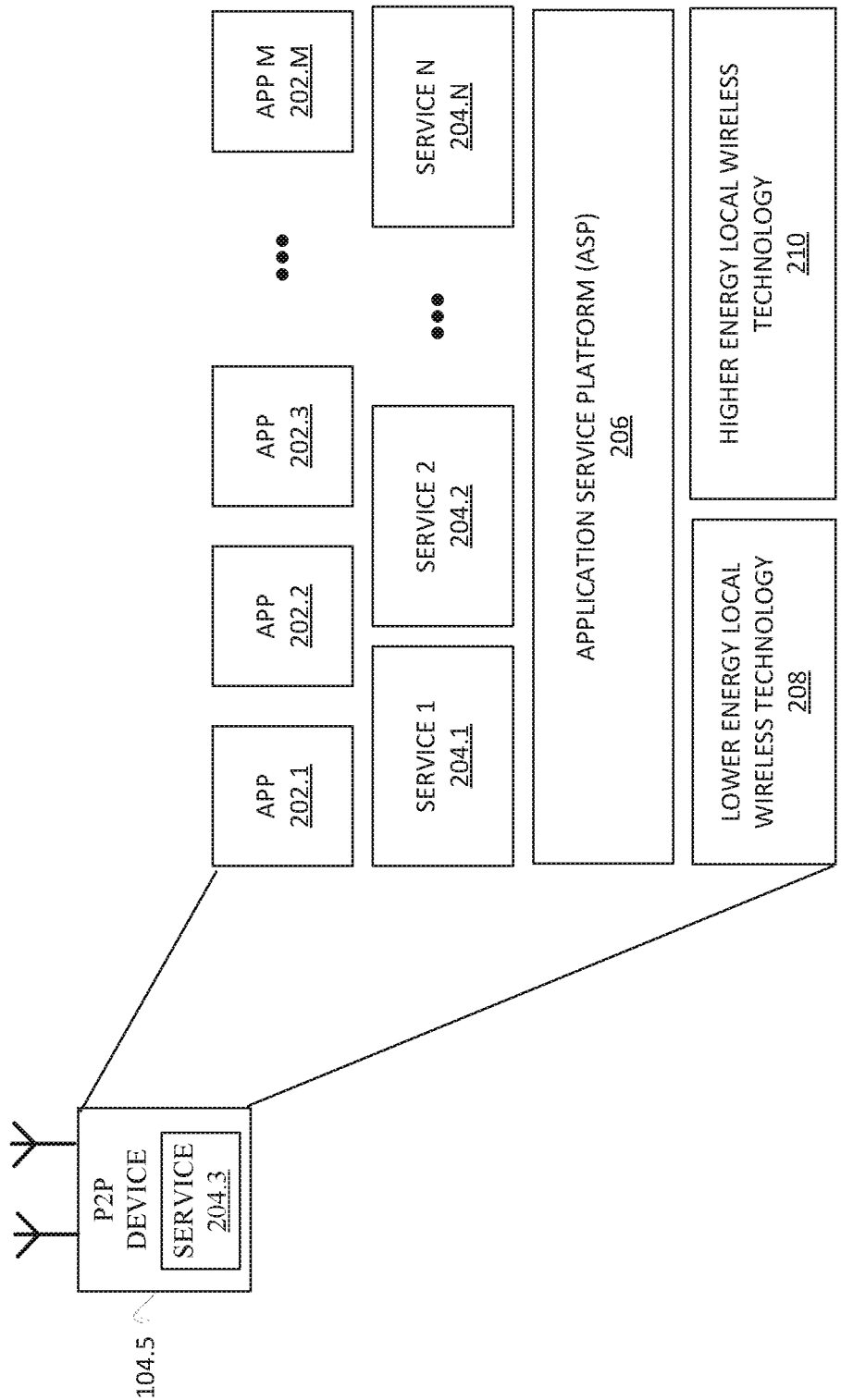
FIG. 2 illustrates a P2P device according to example embodiments.

FIG. 2 illustrates a P2P device 104 according to example embodiments. The P2P device 104 may include an application (APP) 202, services 204, an application service platform (ASP) 206, a lower energy wireless P2P communication technique 208, and a higher energy wireless communication technique 210.

The applications 202 may call services 204, which use the ASP 206, to access the lower energy wireless P2P communication technique 208 or the higher energy wireless communication technique 210 to communicate with another P2P device 104 or an AP 102.

The applications 202 may be applications such as word processing applications, browser applications, and games. In example embodiments, the services 204 may be services that use functions of the ASP 206 and are called by the applications 202. In example embodiments the services 204 include Wi-Fi Direct Services and are divided into send service, play service, print service, display service, and services to enable application programming interfaces services.

In example embodiments, the ASP 206 may be configured to provide common functions needed by the applications 202 and services 204. The ASP 206 may enable or create a session that is a logical link between peers on different P2P devices 104. In example embodiments, the ASP 206 provides functions so that the applications 202, services 204, and ASP 206 operate in accordance with Wi-Fi Direct Services or another standard for providing peer-to-peer services between the P2P 104 devices. In example embodiments, the services 204 and the ASP 206 may be called the Wi-Fi Direct Services where the Wi-Fi Direct Services are called by the applications 202 and use the lower energy wireless P2P communication technique 208 and the higher energy wireless communication technique 210.

As is described herein, the services 204 and/or ASP 206 may be configured to use a lower energy wireless P2P communication technique 208 for a first portion of performing a function provided by the ASP 206 and/or service 204 and use a higher energy wireless communication technique 210 for a second portion of performing the function provided by the ASP 206 and/or service 204.

The lower energy wireless P2P communication technique 208 may provide support for lower energy wireless P2P communication techniques such as low energy BlueTooth®. The ASP 206 may call functions provided by the lower energy wireless P2P communication technique 208 that support one or more low-energy technologies and protocols.

The higher energy wireless communication technique 210 may provide support for the lower energy wireless P2P communication technique 208 such as 802.11. The ASP 206 may call functions provided by the higher energy wireless communication technique 210 that supports one or more higher-energy technologies and protocols.

Figure 3:
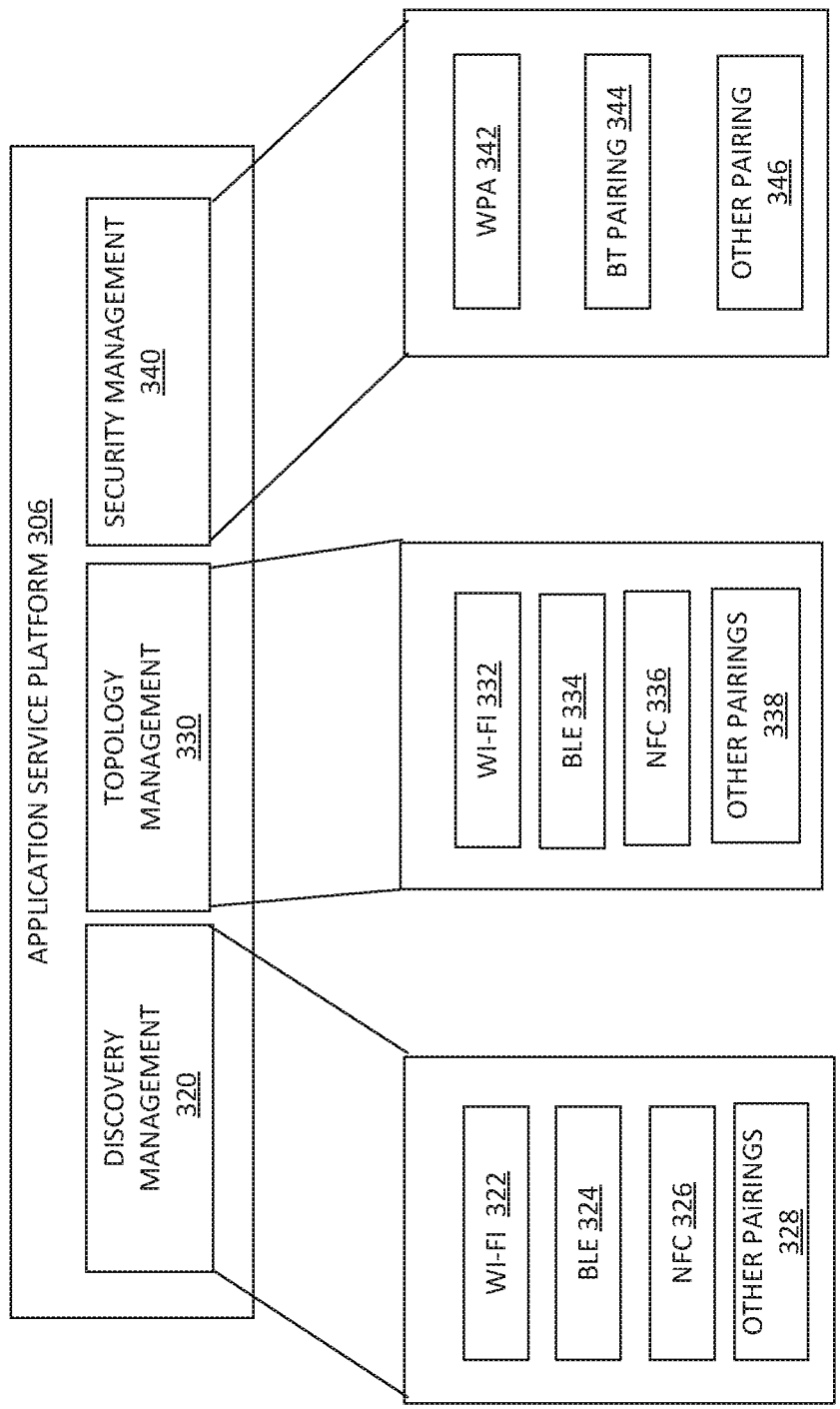
FIG. 3 illustrates the technologies and protocols used by different portions of an application service platform according to example embodiments.

FIG. 3 illustrates the technologies and protocols used by different portions of the application service platform according to example embodiments. The ASP 306 (which may be similar or identical to ASP 206 of FIG. 2) may include three functional areas: discovery management 320, topology management 330, and security management 340.

The different functional areas may use different pairs of wireless technologies and protocols provided by the P2P device 104. The discovery management 320 may include a module for each of Wi-Fi 322, Bluetooth Low Energy (BLE) 324, NFC 326, and other pairings 328. For example, as is described herein, the discovery management 320 may be configured to perform a first portion of discovery management 320 using a lower energy wireless P2P communication technique such as BLE 324 or NFC 326, and then a higher energy wireless communication technique such as Wi-Fi 322 for a second portion of discovery management 320. The discovery management 320 may use other pairings 328 of lower energy and higher energy wireless technologies to perform discovery.

The topology management 330 may include a module for each of Wi-Fi 332, BLE 334, and NFC 336, and other pairings 338 to perform functions related to topology management 330. For example, as is described herein, the topology management 330 may be configured to perform a first portion of topology management 330 using a lower energy wireless P2P communication technique such as BLE 334 or NFC 336, and then a higher energy wireless communication technique such as Wi-Fi 332 for a second portion of topology management 330. The topology management 330 may use other pairings 338 of lower energy and higher energy wireless technologies to perform discovery. For example, the topology management 330 may use lower energy wireless P2P communication technique BLE 334 to discover P2P 104 and then use a higher energy wireless communication technique such as Wi-Fi 322 to connect with a P2P device 104. The higher energy wireless communication technique may be a higher energy local-area wireless communication technique.

The security management 340 may include a module for each of Wi-Fi Protect (WPA) 342, BlueTooth (BT) pairing 344, and other pairings 346. WPA 342 may perform security management using WPA 342 and use a pairing of a lower energy wireless P2P communication technique and a higher energy wireless communication technique. BT pairings 344 may be pairings of lower energy and higher energy wireless technologies for the security management 340 to use. For example, BT or BLE may be paired with WiFi or 802.11. As is described herein, the security management 340 may be configured to perform a first portion of security management 340 using a lower energy wireless P2P communication technique such as BT, LEBT, or NFC, and then a higher energy wireless communication technique such as Wi-Fi for a second portion of security management 340. The security management 340 may use other pairings 346 of lower energy and higher energy wireless technologies to perform security management 340. For example, the security management 340 may use lower energy wireless P2P communication technique BLE to discover P2P device 104 and then use a higher energy wireless communication technique such as Wi-Fi to authenticate the other P2P device 104.

Figure 4:
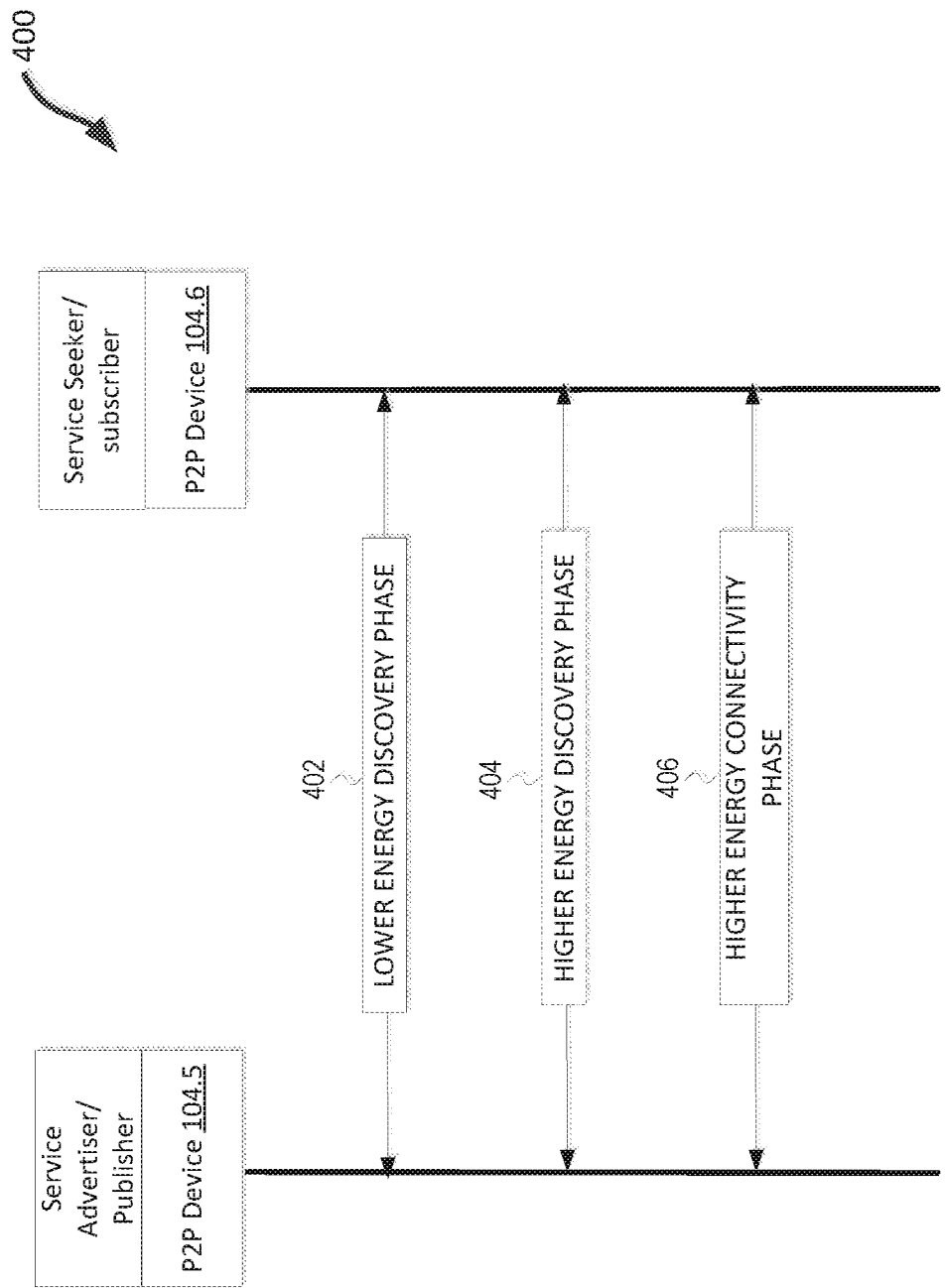
FIG. 4 illustrates a method for switching between a lower energy wireless P2P communication technique and a higher energy wireless communication technique, according to example embodiments.

FIG. 4 illustrates a method 400 for switching between a lower energy wireless P2P communication technique and a higher energy wireless communication technique, according to example embodiments. Illustrated in FIG. 4 are a service advertiser/publisher P2P device 104.5, which extends the example of FIG. 1 where the P2P device 104.5 is a printer, and a service seeker/subscriber P2P device 104.6, which is seeking to find a target printing service.

The method 400 begins at operation(s) 402 with a lower energy discovery phase. For example, P2P device 104.5 may send a beacon frame using BLE that indicates that a printing service is available. The P2P device 104.6 may receive the beacon using BLE and determine that it wants more information regarding the printing service. Optionally, the P2P device 104.6 may send a probe request packet indicating that the P2P device 104.6 is requesting more information regarding the printer service indicated in the beacon. The P2P device 104.5 may send a probe response that indicates more information regarding the printer service.

Optionally, the method 400 continues at operation(s) 404 with a higher energy discovery phase. For example, P2P device 104.6 may send a probe request packet indicating that the P2P device 104.6 is requesting more information regarding the printer service indicated in the beacon. The P2P device 104.6 may use a higher energy wireless communication technique to send the probe request. The indication that the P2P device 104.6 is requesting more information regarding the printer service may be represented by a service hash code where both P2P device 104.5 and P2P device 104.6 have hash functions and tables to encode and decode services into a hash value. The P2P device 104.5 may send a probe response that indicates more information regarding the printer service. The P2P device 104.5 may use a higher energy wireless communication technique to send the probe response.

The method 400 continues at operation 406 with a higher energy connectivity phase. For example, P2P device 104.6 may use a higher energy wireless communication technique to send and receive packets to connect with the P2P device 104.5. The higher energy connectivity phase of operation 406 may include packets for connectivity options and provisioning information. The method 400 may continue with the P2P device 104.6 using the service provided by the P2P device 104.5, which is not illustrated.

FIG. 4 illustrates a method 400 that may be used with the discovery management 320 (FIG. 3). Corresponding methods may be used for the topology management 330 and security management 340, where a first phase may use a lower energy wireless P2P communication technique and a second phase may use a higher energy wireless communication technique.

Figure 5:
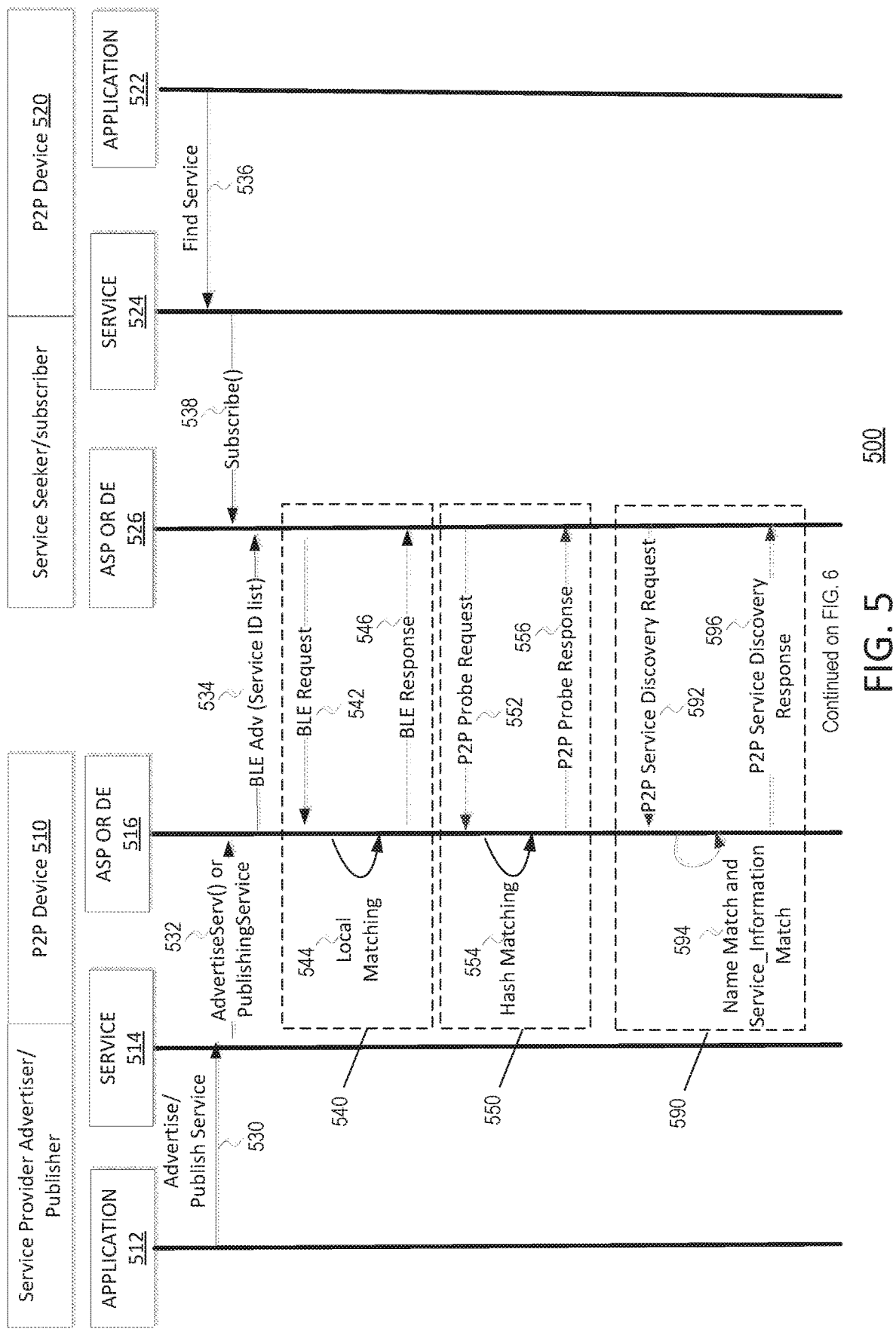
FIGS. 5 and 6 illustrate a method for switching between a lower energy wireless P2P communication technique and a higher energy wireless communication technique, according to example embodiments.
Figure 6:
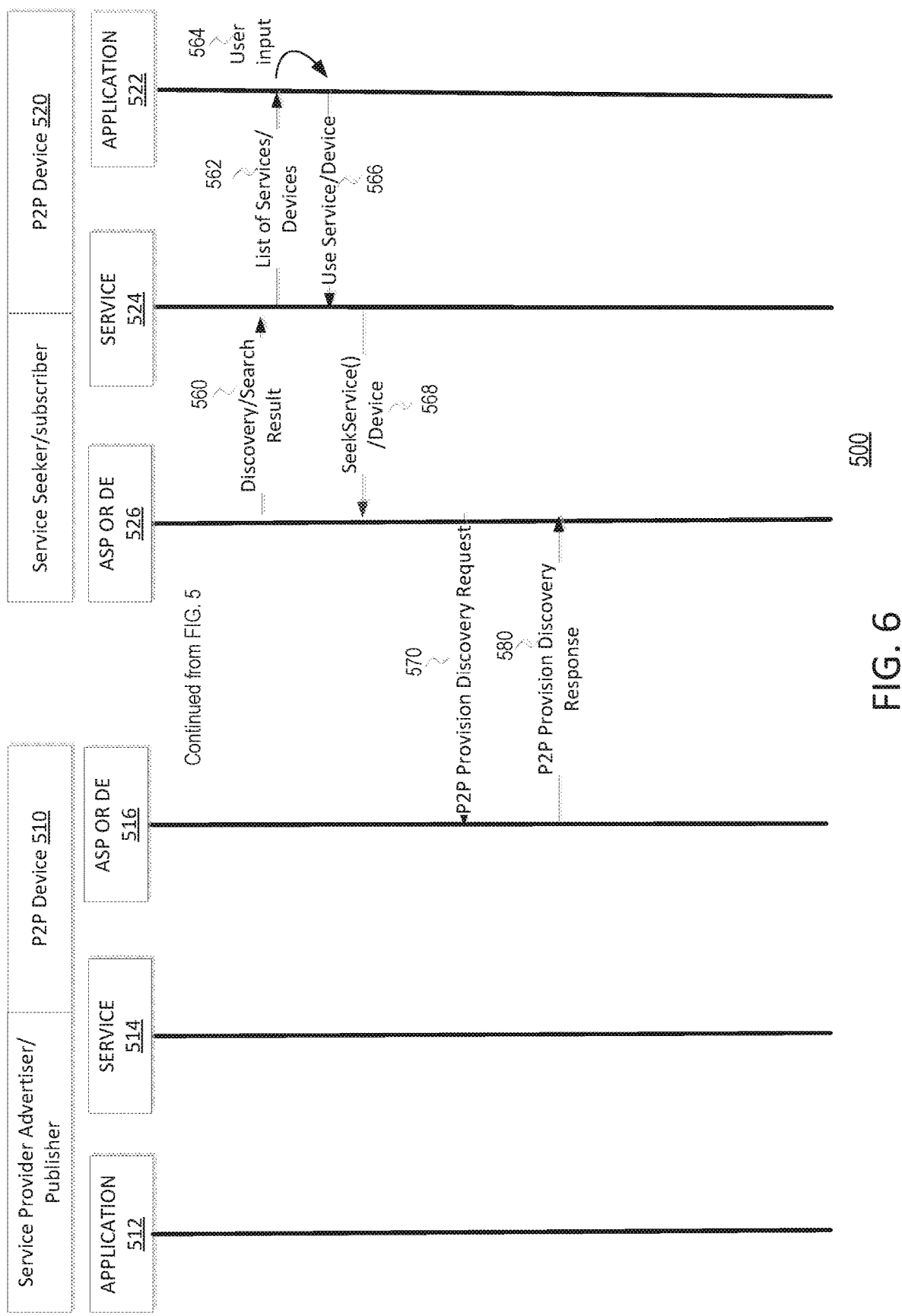

FIGS. 5 and 6 illustrate a method 500 for switching between a lower energy wireless P2P communication technique and a higher energy wireless communication technique, according to example embodiments. Illustrated in FIGS. 5 and 6 are P2P device 510 and P2P device 520. The P2P device 510 may be considered a service advertiser/publisher of a service 514. The P2P device 510 may be a P2P device 104 as described herein. The P2P device 510 may include an application 512, service 514, and ASP or DE 516. The application 512 may be an application 202 as described herein, and be an application 512 such as a printer sharing application. The service 514 may be a service 204 as described herein. The service 514 may be an advertising/publish service. The ASP or DE 516 may be an ASP 206 as described herein. The P2P device 520 may include an application 522, service 524, and ASP or DE 526. The application 522 may be an application 202 as described herein, and be an application 512 such as a word processing application. The service 524 may be a service 204 as described herein. The service 524 may be a printer sharing service. The ASP or DE 526 may be an ASP 206 as described herein.

The method 500 may begin at operation 530 with the application 512 sending calling service 514 requesting that a printer be an advertised/published service. The method 500 may continue at operation 532 with the service 514 calling the ASP or DE 516 with advertise service( ) or publishing service. The service 514 may be calling a function of the ASP or DE 516 that will advertise or publish the availability of the printer on the wireless medium. The method 500 may continue at operation 534 with the ASP or DE 516 transmitting a BLE advertisement with a service ID list. The transmission here is in BLE, but another lower energy wireless P2P communication technique may be used. The service ID list may include an indication that the printing service is available. The service ID list may be a list of service hash numbers.

The method 500 may continue at operation 536 with the application 522 calling a find service. The application 522 may include a type of service such as a printer. The method 500 may continue at operation 538 with service 524 calling the ASP 526 or DE with subscribe( ). The service 524 may be calling function in the ASP or DE 526 to subscribe to the printer service. The operations 536, 538 may have occurred before operations 530, 532, 534. In some embodiments, the operations 536, 538 may be interleaved in time in operations 530, 532, 534.

Optionally, the method 500 continues at 540 with additional lower energy wireless P2P communication technique discovery, which may comprise operations 542, 544, and 546. In example embodiments, the additional lower energy wireless P2P communication technique discovery is not needed if enough information is included in the BLE adv of operation 534. For example, if the service name or service ID is matched with a target service ID or target service name from the BLE adv in operation 534, then the additional lower energy wireless P2P communication technique discovery is not needed.

Optionally, the method 500 continues at operation 542 with a BLE request (service ID, Range, etc.). The ASP or DE 526 may determine, based on the service ID in operation 542, that the service to subscribe to may be available on P2P device 510. The ASP or DE sends the BLE request in operation 542 for additional information.

Optionally, the method 500 continues at operation 544 where the ASP or DE 516 perform local matching with the Service ID to services offered on P2P device 510 and retrieve information for the Service ID. Optionally, the method 500 continues at operation 546 with the ASP or DE 516 transmitting using BLE a response (Service ID, etc.) that includes information regarding the Service ID. Optionally, the lower energy wireless P2P communication technique discovery phase may continue with additional requests and responses or other appropriate frames.

Optionally, the method 500 continues at operation 550 with additional higher energy wireless communication technique discovery, which may comprise operations 552, 554, and 556. The ASP or DE 526 may determine that not enough information was received in BLE advertisement of operation 534 or BLE response of operation 546, and thus determine to perform the operations (552, 554, 556) in additional higher energy wireless communication technique discovery 550. Optionally, the method 500 continues at operation 552 with P2P probe request (service hash). The service hash may be a hash code for the service name. The P2P probe request may have been transmitted using a higher energy wireless network communication technique such as 802.11 or Wi-Fi.

Optionally, the method 500 continues at operation 554 where the ASP or DE 516 perform hash matching with the received service hash to services offered on P2P device 510 and retrieves information for the matched service corresponding to a matched hash match. Optionally, the method 500 continues at operation 556 with the ASP or DE 516 transmitting P2P Probe response (Service name, advertisement ID, etc.) that includes information regarding the service corresponding to the service hash. The P2P Probe response is transmitted using a higher energy wireless communication technique. Optionally, the higher energy wireless communication technique discovery phase may continue with additional requests and responses or other appropriate frames.

Optionally, the method 500 continues at operation 590 with additional higher energy wireless communication technique service discovery, which may comprise operations 592, 594, and 596. The ASP or DE 526 may determine that not enough information was received in BLE advertisement of operation 534 or BLE response of operation 546, and thus determine to perform the operations 592, 594, 596 of operation 590 in additional higher energy wireless communication technique service discovery.

Optionally, the method 500 continues at operation 592 with a P2P service request, which may include a service names and service information request. The P2P service discovery request of operation 592 may have been transmitted using a higher energy wireless network communication technique such as 802.11 or Wi-Fi.

Optionally, the method 500 continues at operation 594 where the ASP or DE 516 performing name matching and service information matching with available services and devices compared with the received P2P service discovery request of operation 592.

Optionally, the method 500 continues at operation 596 with the ASP or DE 516 transmitting P2P Service Discovery Response (Service name, advertisement ID, Service Status, etc.) that includes information regarding the services that matched. The P2P Service Directory Response of operation 596 is transmitted using a higher energy wireless communication technique. Optionally, the higher energy wireless communication technique discovery phase may continue with additional requests and responses or other appropriate frames.

Referring now to FIG. 6, the method 500 may continue at operation 560 with discovery/search results being sent from the ASP or DE 526 to the service 524. There may have been more than one service and device found since there may have been more than one P2P device 510 advertising or publishing services and since the P2P device 510 may have advertised more than one matching service. The method 500 may continue at operation 566 with the list of service and devices 562 being sent to the application 522. Optionally, the method 500 may continue at operation 564 with the application 522 providing a user interface 700 (see FIG. 7) to the user to select whether and which service and device the user would prefer. In example embodiments, the application 522 may select the service and device.

The method 500 may continue at operation 566 with the application 522 sending a use service request to the service 524. The method 500 may continue at operation 568 with the service 524 sending a seek service( )/device to the ASP or DE 526.

The P2P device 520 may determine to use the higher energy wireless communication technique. The method 500 continues at operation 570 with the ASP or DE 526 transmitting a P2P provision discovery request using a higher energy wireless communication technique such as 802.11 or WiFi. The P2P provision discovery request is requesting communication parameters and options for setting up higher energy communication. The P2P provision discovery request of operation 570 may include session information, connection capability, etc. The method 500 may continue at operation 580 with P2P provision discovery response, which may include communication parameters and options for the P2P device 520 to set up the higher energy wireless communication technique. The P2P provision discovery response of operation 580 may include session information, connection capability, etc.

The method 500 may continue with operations where the ASP or DE 516, 526 perform a set-up procedure using the higher energy wireless communication technique. These operations are not illustrated.

Figure 7:
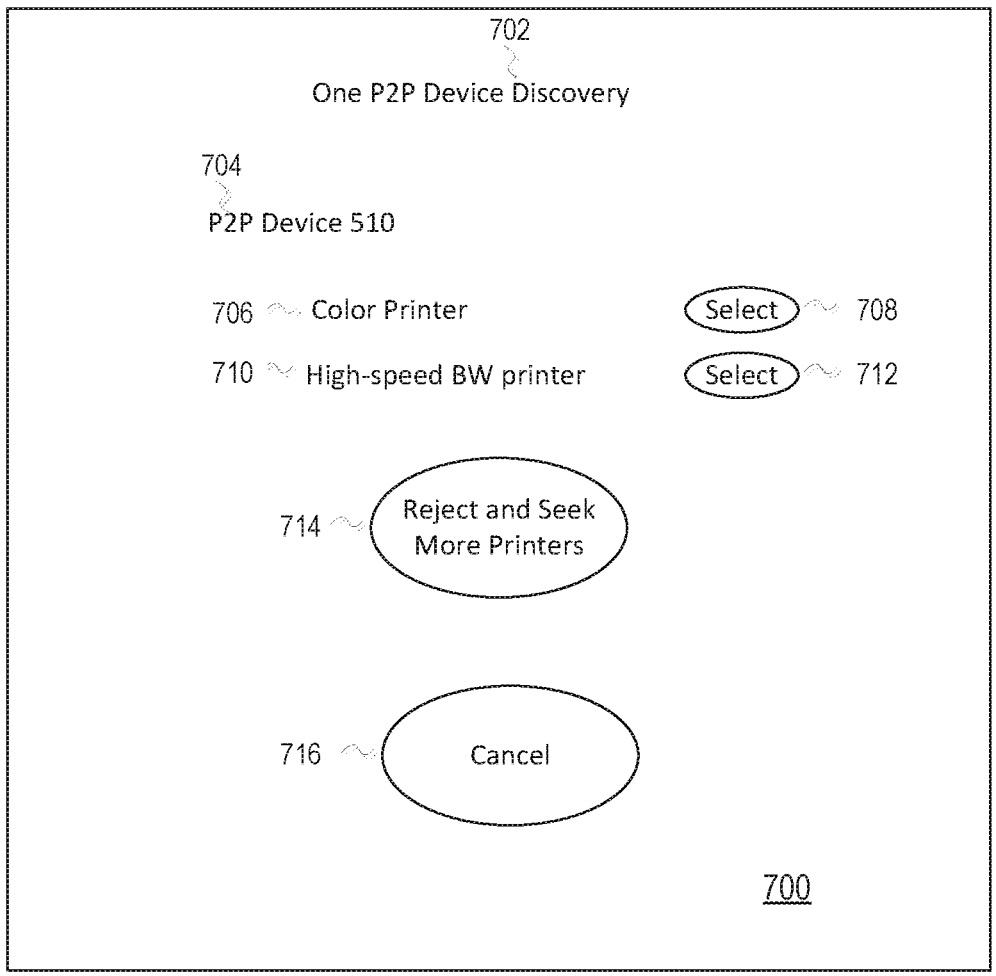
FIG. 7 illustrates a user interface for a user to select a service, according to some example embodiments.

FIG. 7 illustrates a user interface 700 for a user to select a service, according to some example embodiments. The user interface 700 presents the results 702 of the discovery and offers the user (not illustrated) options with buttons 708, 712, 714, 716. As illustrated, "One P2P Device Discovery" indicates the results 702 of the discovery. "P2P Device 510" 704 was found with the service requested. A "color printer" 706 may be selected with button 708, and a "high-speed BW printer" 710 may be selected with button 712. The user is also offered the option with button 714 to "reject and seek more printers," in which case the discovery would reset and seek different printers, or "cancel" (button 716) in which case the entire discovery process would be aborted.

Figure 8:
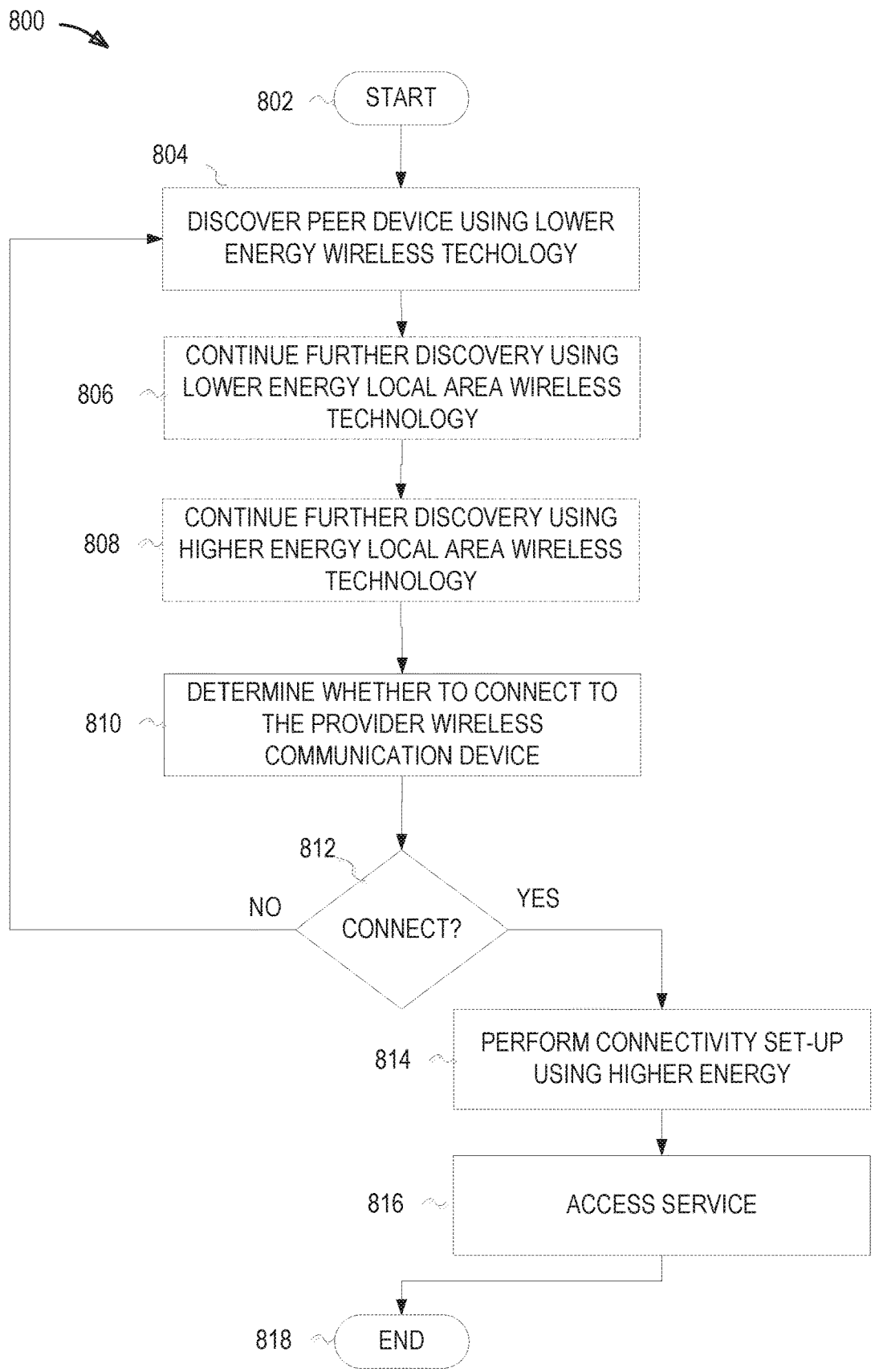
FIG. 8 illustrates a method for switching between a lower energy wireless P2P communication technique and a higher energy wireless communication technique, according example embodiments.

FIG. 8 illustrates a method 800 for switching between a lower energy wireless P2P communication technique and a higher energy wireless communication technique, according example embodiments.

The method 800 starts at operation 802. The method 800 continues at operation 804 with discovering a peer device a using lower energy wireless P2P communication technique. For example, the seeker P2P device 520 receives BLE advertisement (operation 534, FIG. 5).

Optionally, the method 800 continues at operation 806 with continuing further discovery using a lower energy wireless P2P communication technique. For example, the seeker P2P device 520 may determine that the BLE advertisement did not contain enough information to determine whether or not a target service was provided by the provider P2P device 510. The seeker P2P device 520 may then transmit a BLE request (operation 542) for further information.

Optionally, the method 800 continues at operation 808 with continuing further discovery using higher energy wireless communication technique. For example, the seeker P2P device 520 may determine that the BLE advertisement did not contain enough information to determine whether or not a target service was provided by the provider P2P device 510. Moreover, the BLE request may have been transmitted and the BLE response received (operation 546). The seeker P2P device 520 may determine that the BLE response did not contain enough information to determine whether or on a target service was provided by the provider P2P device 510. The seeker P2P device 520 may then transmit a P2P probe request (operation 552) for further information, and/or P2P service discovery request (operation 592).

The method 800 continues at operation 810 with determining whether to connect to the provider wireless device.

For example, at operation 564 the seeker P2P device 520 displays interface 700 to a user, and if the user selects a service and/or device, then the seeker P2P device 520 determines to connect to the provider P2P device 510. In example embodiments, the seeker P2P device 520 may determine, based on discovery information received from the provider P2P device 510, that a target service is not available or suitable and determine not to connect to the provider P2P device 510. The discovery information may be one or more of the following: BLE advertisement, BLE response, P2P probe response, and P2P service directory response. In example embodiments additional discovery may be performed by the seeker P2P device 520.

The method 800 continues at operation 812 with "connect?". If the determination from operation 810 is not to connect, then the method 800 may return to operation 804; however, in example embodiments, other operations may be performed including the method 800 ending at operation 818. If the determination is to connect from operation 810, then the method 800 continues at operation 814 with performing connectivity set-up using a higher energy wireless communication technique.

For example, seeker P2P device 520 may transmit a P2P provision discovery request (operation 570) in accordance with a higher energy wireless communication technique. Other packets may be used to begin the connectivity process.

The method 800 continues at operation 816 with accessing service. For example, after the provider P2P device 510 and the seeker P2P device 520 are connected, then the seeker P2P device 520 may transmit packets to the provider P2P device 510 to user the service provided by the provider P2P device 510. The seeker P2P device 520 may use the higher energy wireless communication technique to access the service. In example embodiments, the seeker P2P device 520 may not access the service. For example, during the connectivity process, the seeker P2P device 520 and/or the provider P2P device 510 may find the other device unacceptable to connect with. For example, there may be security issues, congestion issues, or pricing issues. The method 800 may end at 818.

Figure 9:
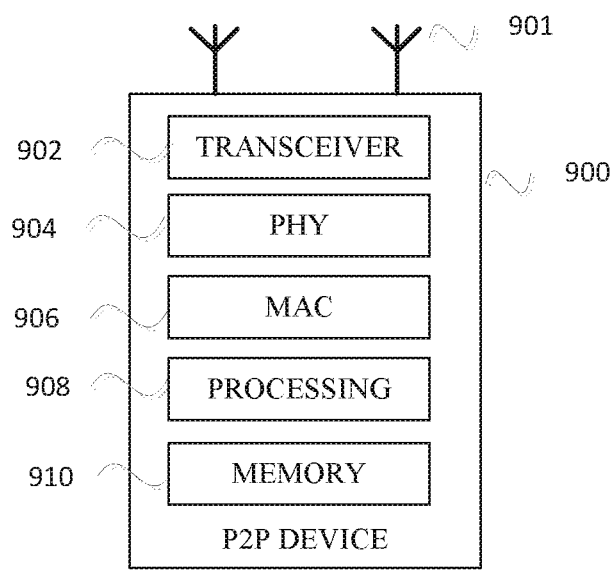
FIG. 9 illustrates a P2P device in accordance with some embodiments.

FIG. 9 illustrates a P2P device 900 in accordance with some embodiments. P2P device 900 may be a P2P compliant device that may be arranged to communicate with one or more other P2P devices, such as P2P devices 104 (FIG. 1), P2P devices 510, 520 (FIG. 5), or access point 102 (FIG. 1). P2P devices 900 may also be referred to as P2P stations (STAs) or just STAs. P2P device 900 may be suitable for operating as access point 102 (FIG. 1) or a P2P device 104 (FIG. 1). P2P device 900 may be configured to operate as a service seeker P2P device 520 or a service provider P2P device 510. P2P device 900 may include applications 202, services 204, ASP 206, lower energy wireless P2P communication technique 208, and higher energy wireless communication technique 210 as described in conjunction with FIGS. 2 and 3.

In accordance with embodiments, P2P device 900 may include, among other things, a transmit/receive element (for example an antenna) 901, a transceiver 902, physical layer circuitry (PHY) 904 and medium-access control layer circuitry (MAC) 906. PHY 904 and MAC 906 may be P2P compliant layers and may be compliant with one or more legacy lower energy wireless P2P technologies and higher energy wireless communication techniques. For example, the P2P device 900 may be compliant with IEEE 802.11 standards such as 802.11n, 802.11ac, 802.11ax, and Bluetooth and Bluetooth low energy standards. MAC 906 may be arranged to configure PPDUs and arranged to transmit and receive PPDUs, among other things.

P2P device 900 may also include other processing circuitry 908 and memory 910, both of which may be configured to perform the various operations described herein. In example embodiments, the processing circuitry 908 is hardware circuitry. The processing circuitry 908 may be coupled to the transceiver 902, which may be coupled to the transmit/receive element 901. While FIG. 9 depicts the processing circuitry 908 and the transceiver 902 as separate components, the processing circuitry 908 and the transceiver 902 may be integrated together in an electronic package or chip.

The PHY 904 may be arranged to transmit the P2P packets. The PHY 904 may include circuitry for modulation/demodulation, upconversion/downconversion, filtering, amplification, etc. In some embodiments, the processing circuitry 908 may include one or more processors. The processing circuitry 908 may be configured to perform functions based on instructions being stored in a RAM or ROM, or based on special purpose circuitry. In some embodiments, the processing circuitry 908 may be configured to perform one or more of the functions described herein for switching between a low energy local area wireless communication technique and a high energy local area wireless communication technique as described in conjunction herein and in conjunction with FIGS. 1-8.

In some embodiments, two or more antennas may be coupled to the PHY 904 and arranged for sending and receiving signals including transmission of the P2P packets. In example embodiments, one or more antennas may be used to transmit in accordance with one or more lower energy wireless P2P technologies, and one or more different antennas may be used to transmit in accordance with one or more higher energy wireless technologies. The P2P device 900 may include a transceiver 902 to transmit and receive data such as P2P packets. The memory 910 may store information for configuring the other circuitry to perform operations for switching between lower energy wireless P2P technologies and higher energy wireless technologies.

In some embodiments, the P2P device 900 may be configured to communicate using OFDM communication signals over a multicarrier communication channel. In some embodiments, P2P device 900 may be configured to communicate in accordance with one or more specific communication standards, such as the lower energy and the higher energy standards discussed herein, although the scope of the example embodiments of the P2P device 900 provided is not limited in this respect as they may also be suitable to transmit and/or receive communications in accordance with other techniques and standards.

In some embodiments, the P2P device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as Bluetooth®, Bluetooth® Low Energy, 802.11 or 802.16, or other device that may receive and/or transmit information wirelessly.

In some embodiments, the mobile device may include one or more of a keyboard, a display, a non-volatile memory port, multiple antennas, a graphics processor, an application processor, speakers, and other mobile device elements. The display may be an LCD screen including a touch screen. The one or more transmit/receive elements 901 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the device 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example embodiments have the technical effect of lowering the power usage by using a lower energy wireless P2P communication technique for a first portion or first phase and using a higher energy wireless communication technique for a second phase.

Example embodiments have the technical effect of providing a lower energy power save mode by monitoring the wireless medium for beacon frames using a lower energy wireless P2P communication technique and then switching to a higher energy wireless communication technique at some point after receiving the beacon frame. This may permit the P2P device 104 to continually monitor for a service in the lower energy wireless P2P communication technique, thus consuming less power.

Example embodiments have the technical effect of reducing the power by using a lower energy wireless P2P communication technique to advertise services and/or devices and then switching to a higher energy wireless communication technique at some point after another P2P device 104 indicates that it is interested in further discovery or using the advertised service.

The following examples pertain to further embodiments. Example 1 is a service seeker wireless communication device including circuitry. The circuitry may be configured to receive a packet in accordance with a lower energy wireless P2P network peer-to-peer (P2P) communication technique from a service provider wireless device, wherein the packet indicates one or more services provided by the service provider wireless device; determine to switch to a higher energy wireless P2P communication technique to communicate with the service provider wireless device based on a determination that a target service is provided by the service provider wireless device; and perform a connectivity setup with the service provider wireless device to use the target service in accordance with the higher energy wireless P2P communication technique.

In Example 2, the subject matter of Example 1 can optionally include where the circuitry is further configured to: transmit a P2P request packet that comprises an indication of the target service to the service provider wireless device, wherein the transmit is in accordance with the lower energy wireless P2P network communication technique; and wherein the packet is received in response to the transmitted P2P request packet, and wherein the packet further indicates information regarding the target service.

In Example 3, the subject matter of Example 1 can optionally include where the circuitry is further configured to: transmit a P2P request packet that comprises an indication of the target service to the service provider wireless device in accordance with the higher energy wireless P2P communication technique; and receive a P2P response packet from the provider wireless device in accordance with the higher energy wireless P2P communication technique, wherein the response packet comprises information regarding the target service.

In Example 4, the subject matter of Example 3 can optionally include where the circuitry is further configured to: transmit the P2P request packet that comprises the indication of the target service to the service provider wireless device in accordance with the higher energy wireless P2P communication technique if indication of the one or more services provided by the provider wireless device does not indicate whether the target service is provided by the service provider wireless device.

In Example 5, the subject matter of Example 3 can optionally include where the circuitry is further configured to: transmit a P2P service discovery request packet that comprises an indication of the target service to the service provider wireless device in accordance with the higher energy wireless P2P communication technique; and receive a P2P service discovery response packet from the service provider wireless device in accordance with the higher energy wireless P2P communication technique, wherein the response packet comprises information regarding the target service.

In Example 6, the subject matter of any of Examples 1 through 5 can optionally include where the packet is a P2P beacon packet. In Example 7, the subject matter of any of Examples 1 through 6 can optionally include where the lower energy wireless P2P network communication technique is at least one from a group comprising: Bluetooth®, Bluetooth® Low Energy, neighbor aware networking (NAN) program, and Near-field communication (NFC), and wherein the higher energy wireless P2P communication technique is at least one from a group comprising: Institute of Electronic and Electrical Engineers (IEEE) 802.11, 802.16, 802.11ax, WiGig, and WiFi.

In Example 8, the subject matter of any of Examples 1 through 7 can optionally include where the packet indicates the one or more services with at least one of a group comprising: a hash code, service name, and a provider wireless device address, and a provider wireless device name.

In Example 9, the subject matter of any of Examples 1 through 8 can optionally include where the circuitry is further configured to: display service names of the one or more services that match the target service to a user; receive an indication of a selected service of the one or more services that match the target service from the user; and determine to switch to the higher energy wireless P2P communication technique to communicate with the service provider wireless device based on a determination that the target service is provided by the service provider wireless device and based on the indication of the selected service from the user.

In Example 10, the subject matter of any of Examples 1-9 can optionally include where the circuitry is further configured to: send a request for the target service to a service from an application; send a request to subscribe to the target service to an application service layer, wherein the application service layer is to: first use the lower energy wireless P2P network communication technique for at least a first portion of a discovery phase, and use the higher energy wireless P2P communication technique for a connectivity phase.

In Example 11, the subject matter of any of Examples 1 through 10 can optionally include where the circuitry is further configured to: perform the connectivity setup with the service provider wireless device to use the target service in accordance with the higher energy wireless P2P communication technique, if it is determined to connect to the service provider wireless device to access the target service.

In Example 12, the subject matter of any of Examples 1 through 10 can optionally include where the circuitry is further configured to: scan a plurality of channels for the packet; and receive the packet in accordance with the lower energy wireless P2P network communication technique from the service provider wireless device, wherein the packet indicates one or more services provided by the service provider wireless device, and wherein the packet is received on one of the plurality of channels.

In Example 13, the subject matter of any of Examples 1-12 can optionally include memory and a transceiver coupled to the circuitry. In Example 14, the subject matter of Example 13 can optionally include one or more antennas coupled to the transceiver.

Example 15 is a method on a service seeker wireless communication device. The method may include receiving a packet in accordance with a lower energy wireless peer-to-peer (P2P) network communication technique from a service provider wireless device, wherein the packet indicates one or more services provided by the service provider wireless device; determining to switch to a higher energy wireless P2P communication technique to communicate with the service provider wireless device based on a determination that a target service is provided by the service provider wireless device; and performing a connectivity setup with the service provider wireless device to use the target service in accordance with the higher energy wireless P2P communication technique.

In Example 16, the subject matter of Example 15 can optionally include transmitting a P2P request packet that comprises an indication of the target service to the service provider wireless device, wherein the transmitting is in accordance with the lower energy wireless P2P network communication technique; and receiving a P2P response packet from the service provider wireless device in accordance with the lower energy wireless P2P network communication technique, wherein the response packet comprises information regarding the target service.

In Example 17, the subject matter of Example 15 can optionally include transmitting a P2P request packet that comprises an indication of the target service to the service provider wireless device in accordance with the higher energy wireless P2P communication technique; and receiving a P2P response packet from the service provider wireless device in accordance with the higher energy wireless P2P communication technique, wherein the response packet comprises information regarding the target service.

Example 18 is a service provider wireless communication device including circuitry. The circuitry may be configured to: transmit a packet in accordance with a lower energy wireless peer-to-peer (P2P) network communication technique to a service seeker wireless communication device, wherein the packet indicates one or more services provided by the service provider wireless communication device; monitor a higher energy wireless P2P communication technique and the lower energy wireless P2P network communication technique for a response to the transmitted packet; and receive a provision discovery request from the service seeker wireless communication device in accordance with the higher energy wireless P2P communication technique, in response to the transmitted packet.

In Example 19, the subject matter of Example 18 can optionally include where the circuitry is further configured to: receive a P2P request packet that comprises an indication of a target service from the service seeker wireless device, wherein the transmit is in accordance with the lower energy wireless P2P network communication technique; and transmit a P2P response packet to the service seeker wireless device in accordance with the lower energy wireless P2P network communication technique, wherein the P2P response packet comprises information regarding the target service.

In Example 20, the subject matter of Example 19 can optionally include where the circuitry is further configured to: receive a P2P request packet that comprises an indication of a target service from the service seeker wireless device in accordance with the higher energy wireless P2P communication technique; and transmit a P2P response packet to the service seeker wireless device in accordance with the higher energy wireless communication technique, wherein the response packet comprises information regarding the target service.

In Example 21, the subject matter of Example 18 can optionally include where the circuitry is further to: receive a P2P service discovery request packet that comprises an indication of a target service from the service seeker wireless device in accordance with the higher energy wireless P2P communication technique; and transmit a P2P service discovery response packet to the service seeker wireless device in accordance with the higher energy wireless P2P communication technique, wherein the response packet comprises information regarding the target service.

In Example 22, the subject matter of any of Examples 18 through 21 can optionally include where the lower energy wireless P2P network communication technique is at least one from a group comprising: Bluetooth®, Bluetooth® Low Energy, neighbor aware networking (NAN) program, and Near-field communication (NFC), and wherein the higher energy wireless P2P communication technique is at least one from a group comprising: and Institute of Electronic and Electrical Engineers (IEEE) 802.11, 802.16, 802.11ax, WiGig, and WiFi.

In Example 23, the subject matter of any of Examples 18-22 can optionally include memory coupled to the circuitry, one or more transceivers coupled to the circuitry, and one or more antennas coupled to the one or more transceivers.

Example 24 is a non-transitory computer-readable storage medium that stores instructions for execution by one or more processors to perform operations in a service seeker wireless device, where the operations configure the service seeker wireless device to: receive a packet in accordance with a lower energy wireless peer-to-peer (P2P) network communication technique from a service provider wireless device, wherein the packet indicates one or more services provided by the service provider wireless device; determine to switch to a higher energy wireless P2P communication technique to communicate with the service provider wireless device based on a determination that a target service is provided by the service provider wireless device; and perform a connectivity setup with the service provider wireless device to use the target service in accordance with the higher energy wireless P2P communication technique.

In Example 25, the subject matter of Example 24 can optionally include where the operations further configure the service seeker wireless device to: transmit a P2P request packet that comprises an indication of the target service to the service provider wireless device, wherein the transmit is in accordance with the lower energy wireless P2P network communication technique; and receive a P2P response packet from the service provider wireless device in accordance with the lower energy wireless P2P network communication technique, wherein the response packet comprises information regarding the target service.

In Example 26, the subject matter of any of claims 1-25 can optionally include where the higher energy wireless P2P communication technique may be a higher energy local area wireless communication technique that may be a P2P communication technique.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising: at least one processor configured to cause a service seeker wireless communication device to:
   decode an advertisement received in accordance with a Bluetooth low energy (BLE) wireless peer-to-peer (P2P) communication technique from an advertiser wireless communication device, wherein the advertisement comprises a bit array that indicates hash values of services advertised by the advertiser wireless communication device; and
   when the bit array indicates that a hash value of a target service is set:
      determine a service hash of the target service,
      encode a P2P probe request comprising the service hash,
      configure the service seeker wireless communication device to transmit the P2P probe request in accordance with a Wi-Fi protocol,
      decode a P2P probe response comprising an advertisement identification of one or more services provided by the advertiser wireless communication device, wherein the advertisement identification of one or more services comprises an instance name of a service that matches the second hash, wherein the one or more services are offered by the advertiser wireless communication device, and the P2P probe response is received in accordance with the Wi-Fi protocol, and
      perform a connectivity setup, using the Wi-Fi protocol, with the advertiser wireless communication device to use the instance name of the service.

2. The apparatus of claim 1, wherein the at least one processor is further configured to:
   transmit, in accordance with a lower energy wireless P2P network communication technique, a P2P request packet that comprises an indication of the target service to the advertiser wireless communication device; and
   receive a P2P response packet from the advertiser wireless communication device, and wherein the response packet comprises information regarding the target service.

3. The apparatus of claim 1, wherein the at least one processor is further configured to:
   transmit, in accordance with a higher energy wireless P2P network communication technique, a P2P request packet that comprises an indication of the target service to the advertiser wireless communication device; and
   receive a P2P response packet from the advertiser wireless communication device, and wherein the response packet comprises information regarding the target service.

4. The apparatus of claim 3, wherein the at least one processor is further configured to:
   transmit, in accordance with the higher energy wireless P2P network communication technique, the P2P request packet that comprises the indication of the target service to the advertiser wireless communication device if indication of the one or more services provided by the advertiser wireless communication device does not indicate whether the target service is provided by the advertiser wireless communication device.

5. The apparatus of claim 3, wherein the at least one processor is further configured to:
   transmit, in accordance with the higher energy wireless P2P network communication technique, a P2P service discovery request packet that comprises an indication of the target service to the advertiser wireless communication device; and
   receive a P2P service discovery response packet from the advertiser wireless communication device, and wherein the response packet comprises information regarding the target service.

6. The apparatus of claim 1, wherein the at least one processor is further configured to receive a beacon frame from the advertiser wireless communication device using BLE; and
   wherein the beacon frame indicates that the one or more services are available.

7. The apparatus of claim 6, wherein the P2P probe request is transmitted by the service seeker wireless communication device in order to request additional information regarding the one or more services indicated in the beacon frame.

8. A wireless device comprising:
   wireless communication circuitry; and
   one or more processors coupled to the wireless communication circuitry configured to cause a service seeker wireless communication device to:
      decode an advertisement received in accordance with a Bluetooth low energy (BLE) wireless peer-to-peer (P2P) communication technique from an advertiser wireless communication device, wherein the advertisement comprises a bit array that indicates hash values of services advertised by the advertiser wireless communication device; and
      when the bit array indicates that a hash value of a target service is set:
         determine a service hash of the target service,
         encode a P2P probe request comprising the service hash,
         configure the service seeker wireless communication device to transmit the P2P probe request in accordance with a Wi-Fi protocol, decode a P2P probe response comprising an advertisement identification of one or more services provided by the advertiser wireless communication device, wherein the advertisement identification of one or more services comprises an instance name of a service that matches the second hash, wherein the one or more services are offered by the advertiser wireless communication device, and the P2P probe response is received in accordance with the Wi-Fi protocol, and perform a connectivity setup, using the Wi-Fi protocol, with the advertiser wireless communication device to use the instance name of the service.

9. The wireless device of claim 8, wherein the at least one processor is further configured to:

transmit, in accordance with a lower energy wireless P2P network communication technique, a P2P request packet that comprises an indication of the target service to the advertiser wireless communication device; and receive a P2P response packet from the advertiser wireless communication device, and wherein the response packet comprises information regarding the target service.

10. The wireless device of claim 8, wherein the at least one processor is further configured to:

transmit, in accordance with a higher energy wireless P2P communication technique, a P2P request packet that comprises an indication of the target service to the advertiser wireless communication device; and receive a P2P response packet from the advertiser wireless communication device, and wherein the response packet comprises information regarding the target service.

11. The wireless device of claim 10, wherein the at least one processor is further configured to:

transmit, in accordance with the higher energy wireless P2P communication technique, the P2P request packet that comprises the indication of the target service to the advertiser wireless communication device if indication of the one or more services provided by the advertiser wireless communication device does not indicate whether the target service is provided by the advertiser wireless communication device.

12. The wireless device of claim 10, wherein the at least one processor is further configured to:

transmit, in accordance with the higher energy wireless P2P communication technique, a P2P service discovery request packet that comprises an indication of the target service to the advertiser wireless communication device; and receive a P2P service discovery response packet from the advertiser wireless communication device, and wherein the response packet comprises information regarding the target service.

13. The wireless device of claim 8, wherein the at least one processor is further configured to receive a beacon frame from the advertiser wireless communication device using BLE; and wherein the beacon frame indicates that the one or more services are available.

14. The wireless device of claim 13, wherein the P2P probe request is transmitted by the service seeker wireless communication device in order to request additional information regarding the one or more services indicated in the beacon frame.

15. A method for operating a service seeker wireless communication device comprising:

decoding an advertisement received in accordance with a Bluetooth low energy (BLE) wireless peer-to-peer (P2P) communication technique from an advertiser wireless communication device, wherein the advertisement comprises a bit array that indicates hash values of services advertised by the advertiser wireless communication device; and when the bit array indicates that a hash value of a target service is set:

determining a service hash of the target service, encoding a P2P probe request comprising the service hash, configuring the service seeker wireless communication device to transmit the P2P probe request in accordance with a Wi-Fi protocol, decoding a P2P probe response comprising an advertisement identification of one or more services provided by the advertiser wireless communication device, wherein the advertisement identification of one or more services comprises an instance name of a service that matches the second hash, wherein the one or more services are offered by the advertiser wireless communication device, and the P2P probe response is received in accordance with the Wi-Fi protocol, and performing a connectivity setup, using the Wi-Fi protocol, with the advertiser wireless communication device to use the instance name of the service.

16. The method of claim 15, further comprising:

transmitting, in accordance with a lower energy wireless P2P network communication technique, a P2P request packet that comprises an indication of the target service to the advertiser wireless communication device; and receiving a P2P response packet from the advertiser wireless communication device, and wherein the response packet comprises information regarding the target service.

17. The method of claim 15, further comprising:

transmitting, in accordance with a higher energy wireless P2P communication technique, a P2P request packet that comprises an indication of the target service to the advertiser wireless communication device; and receiving a P2P response packet from the advertiser wireless communication, and wherein the response packet comprises information regarding the target service.

18. The method of claim 17, further comprising:

transmitting, in accordance with the higher energy wireless P2P communication technique, the P2P request packet that comprises the indication of the target service to the advertiser wireless communication device if indication of the one or more services provided by the advertiser wireless communication device does not indicate whether the target service is provided by the service advertiser wireless communication device.

19. The method of claim 17, further comprising:

transmitting, in accordance with the higher energy wireless P2P communication technique, a P2P service discovery request packet that comprises an indication of the target service to the advertiser wireless communication device; and receiving a P2P service discovery response packet from the advertiser wireless communication device, and wherein the response packet comprises information regarding the target service.

20. The method of claim 15, wherein the at least one processor is further configured to receive a beacon frame from the advertiser wireless communication device using BLE; and wherein the beacon frame indicates that the one or more services are available.

\* \* \* \* \*